US006928866B2

(12) United States Patent
Michalski et al.

(10) Patent No.: US 6,928,866 B2
(45) Date of Patent: Aug. 16, 2005

(54) DEVICE FOR THE MEASUREMENT AND MONITORING OF A PROCESS PARAMETER

(75) Inventors: Bernhard Michalski, Maulburg (DE); Bernd Strütt, Steinen (DE); Sebastian Heidepriem, Neuenburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/466,763

(22) PCT Filed: Dec. 13, 2001

(86) PCT No.: PCT/EP01/14671
§ 371 (c)(1),
(2), (4) Date: Nov. 18, 2003

(87) PCT Pub. No.: WO02/063252
PCT Pub. Date: Aug. 15, 2002

(65) Prior Publication Data
US 2004/0074295 A1 Apr. 22, 2004

(30) Foreign Application Priority Data
Feb. 5, 2001 (DE) .......................... 101 05 473

(51) Int. Cl.$^7$ .......................... G01F 23/00; G01S 13/32
(52) U.S. Cl. .................... 73/290 R; 73/290 V; 324/124
(58) Field of Search ....................... 73/290 R

(56) References Cited

U.S. PATENT DOCUMENTS

| 5,207,101 A | 5/1993 | Haynes |
| 5,416,723 A | 5/1995 | Zyl |
| 5,671,606 A | 9/1997 | Schroeder et al. |
| 5,672,975 A | 9/1997 | Kielb |
| 6,014,100 A | 1/2000 | Fehrenbach et al. |

FOREIGN PATENT DOCUMENTS

| DE | 310 74 44 | 10/1982 |
| DE | 36 15 452 | 11/1987 |
| DE | 361 54 63 | 11/1987 |
| DE | 363 61 11 A1 | 2/1988 |
| DE | 434 12 432 A1 | 10/1994 |
| DE | 43 42 069 C2 | 6/1995 |
| DE | 196 21 449 | 12/1997 |
| EP | 06 87 375 | 5/1995 |

*Primary Examiner*—Hezron Williams
*Assistant Examiner*—Katina Wilson
(74) *Attorney, Agent, or Firm*—Bacon & Thomas

(57) ABSTRACT

The invention concerns a device for measuring and/or monitoring a process parameter, with a sensor, an intermittently working measurement circuit, which has at least one energy storer unit, wherein the measurement circuit or individual components of the measurement circuit are activated for a predetermined time span, the so-called active phase, and with a control center, wherein the measurement circuit and the control center are connected with one another over a two-wire line and wherein a control-/evaluation-unit is provided, which activates the measurement circuit at the earliest, when the energy in the energy storer unit has reached a predetermined level.

9 Claims, 5 Drawing Sheets

US 6,928,866 B2

DEVICE FOR THE MEASUREMENT AND MONITORING OF A PROCESS PARAMETER

TECHNICAL FIELD

The invention relates to a device for measuring and/or monitoring a process parameter. The device includes the following components: a sensor; an intermittently working, measuring circuit, which has at least one energy storage unit, wherein the measuring circuit, or individual components of the measurement circuit, each are activated for a predetermined time span, the so-called active phase; and a control center. The measurement circuit and the control center are connected with one another over a two-wire line. According to a preferred embodiment of the device, both the energy supply to the device and the data exchange between the measurement circuit and the control center occur over the two-wire line.

BACKGROUND

Because of this double-function of the two-wire line and the associated cost saving, two-wire measurement apparatuses are being applied to an increasing extent in industrial process technology. An important industry standard in this connection is the ISA-A 50.1-Standard, in which direct current values between 4 mA and 20 mA characterize the particular measurement value and are transmitted over the two-wire line.

Not quite problem free in the case of two-wire measurement apparatuses is that even in the case of a very small current level of e.g. 4 mA there still must be enough power made available over the two-wire line to operate the measurement circuit, or its individual components. The power supply issue here is naturally even more critical, the higher the power requirement of the measurement circuit, or its components, becomes.

Basically, there are two possibilities for handling the problem. Either the measurement circuit is constructed of components with a correspondingly small energy consumption—a solution, which enables a continuous operation of the measurement circuit, or components with a relatively high energy consumption are operated intermittently. In the case of intermittent operation, energy is consumed only during the so-called active phase, while the recovery phase following thereafter is used for charging an energy storer, which then can supply the active components of the measurement circuit with the required power again in the next active phase. As an example of a two-wire measurement apparatus of the first named kind, U.S. Pat. No. 5,672,975 is noted. As an example for a device with intermittent operation, European Patent EP 0 687 375 B1 is noted named.

In the European patent, the measurement frequency of the measurement value transmitter is so designed, that the corresponding power demand is greater than the power available over the two-wire line in the case of minimum current and minimum voltage. Since the consumed power exceeds the available power during the operation of the measurement value transmitter, a deficit appears inevitably in the power balance. As soon as a sensing circuit recognizes a deficit, the measurement circuit stops operation of the measurement program, until the deficit no longer exists. In short, in this known solution, a deficit is diagnosed in an energy storer. On the basis of this deficit, a longer cycle time is predicted to be necessary—the measurement frequency is then correspondingly changed. In the end, this means that it is always estimated, when the energy storer will be completely charged, or charged to a certain level. Following expiration of this estimated time, a measurement signal is then issued. This known solution has the disadvantage, that it accepts excessively long inactive phases. Consequently, the measurement rate of the measurement system—and thus the measurement accuracy of the fill level measurement apparatus—is lowered.

SUMMARY OF THE INVENTION

The object of the invention is to provide a device for optimizing power control in a fill level measurement apparatus.

The object is achieved by providing a control/evaluation-unit, which activates the measurement circuit at the earliest when the energy in the energy storer reaches a predetermined level. For this, the level can, for example, be sized such that it covers at least the energy requirement of the measurement circuit during the active phase. Preferably, the level is, however, defined by the condition that the energy storage unit is completely, or almost completely, charged.

Compared with the state of the art, the solution of the invention exhibits three decisive advantages:

The device of the invention excels on the basis of an increased reliability: While the measurement circuit of the prior art first reacts when a critical voltage is exceeded, in the case of the solution of the invention, the energy storer is always as completely charged as possible. This is generally above all important, when DC/DC converters are used between the energy storer and the energy consumer: In order to draw the necessary energy from the energy storer, the DC/DC converter according to I=U/R will take the current in inverse proportion to the storer voltage from the energy storer. This means in the case of the known solution that, for critically low storer voltages, the constant current consumption from the energy storer increases, so that a recovery of the system with decreasing voltage becomes always more improbable.

The device of the invention exhibits shorter cycle rates than the state of the art: Since, in the case of an insufficient energy supply, the energy is held at a level near the maximum and not at a low, critical level, the voltage across the current regulator, which sets the current, also decreases significantly. This residual voltage leads, moreover, as a matter of course, to a conversion of electrical energy into heat according to the formula P=U·I. If the energy storer is always charged completely, or almost completely, this voltage becomes lower and, consequently, also the energy transformed into heat. The energy fraction gained hereby consequently additionally becomes available to the components of the measurement circuit.

The device of the invention is parameter independent: Since the cycle time is not calculated, but, instead, the charge state of the energy storer is watched, the device of the invention is independent of the constant current consumption, the pulse current consumption, and the energy supply. It only must be guaranteed that the energy storer is charged without pulse, which means that the current of the consumer must be smaller than the current supply, and the energy extraction during the active phase must not drain the energy storer too far down. This is, however, in the end a question of the sizing of the measurement circuit.

According to a preferred further development of the device of the invention, it is provided that the process parameter is the fill level of a fill material in a container. In particular, the sensor is a fill level sensor, which emits measurement signals in the direction of the surface of the fill material and which receives echo signals reflected at the surface of the fill material. The measurement signals are electromagnetic signals, e.g. microwave signals, or ultrasonic signals. In the case of microwave signals, they either propagate in free field or they are directed into the container over a conductive element. Corresponding measurement apparatuses are offered and distributed by the applicant under the designations "Micropilot" or "Levelflex" or "Prosonic".

The actual fill level measurement value is established using the so-called travel time method on the basis of the useful, or true, echo signal of the digital envelope curve, or the echo curve. Herein, the echo curve represents the amplitude values of the echo signal as a function of the travel time of the measurement signal on the path between the antenna and the surface of the fill material. Using the echo curve, the useful echo signal is determined, which represents the signal portion that is reflected at the surface of the fill material.

Devices that determine the fill level of a fill material in a container using the travel time of the measurement signal use the physical law that the travel distance equals the product of travel time and propagation velocity. In the case of fill level measurement, the travel distance corresponds to twice the distance between the antenna and the surface of the fill material. The fill level then equals the difference between the known distance of the antenna from the floor of the container and the distance of the surface of the fill material from the antenna, as determined by the travel time measurement.

If high-frequency microwave signal are used as the measurement signals, then the echo signals are usually transformed into a lower frequency range using a sequential scanning, or sampling, method. The intermediate frequency signal created by the transformation is subsequently evaluated. A characteristic of the intermediate frequency signal is that it has the same course as the envelope; however, it is stretched relative to this by a defined time expansion factor. The advantage of the transformation to the intermediate frequency is principally that relatively slow and consequently cost-favorable electronic components can be used for the signal registering and/or signal evaluation. An embodiment of a method for sequential sampling of echo-signals is described in German Patent, DE 31 07 444 A1.

According to a preferred embodiment of the device of the invention, the energy storer unit is a capacitor. A favorable further development, moreover, provides that a storer limiting unit is connected in parallel with the capacitor. An example of a storer limiting unit is a Z-diode.

In order always to be able to be certain that the power needs of the fill level measuring apparatus are covered, an advantageous embodiment of the device of the invention provides that the control-/evaluation-circuit initiates the active phase, as soon as a predetermined current value and/or voltage value has been reached in the measuring circuit or in a component of the measuring circuit.

It has been found that it is particularly advantageous, when the control-/evaluation-unit initiates the active phase first at that point in time when the predetermined current value and/or voltage value is/are constant over a predetermined time interval. In particular, the control-/evaluation-unit provides an additional minimum wait time, before it initiates the active phase.

The invention is explained in grater detail on the basis of the following drawings,

DETAILED DESCRIPTION

Figure 1:
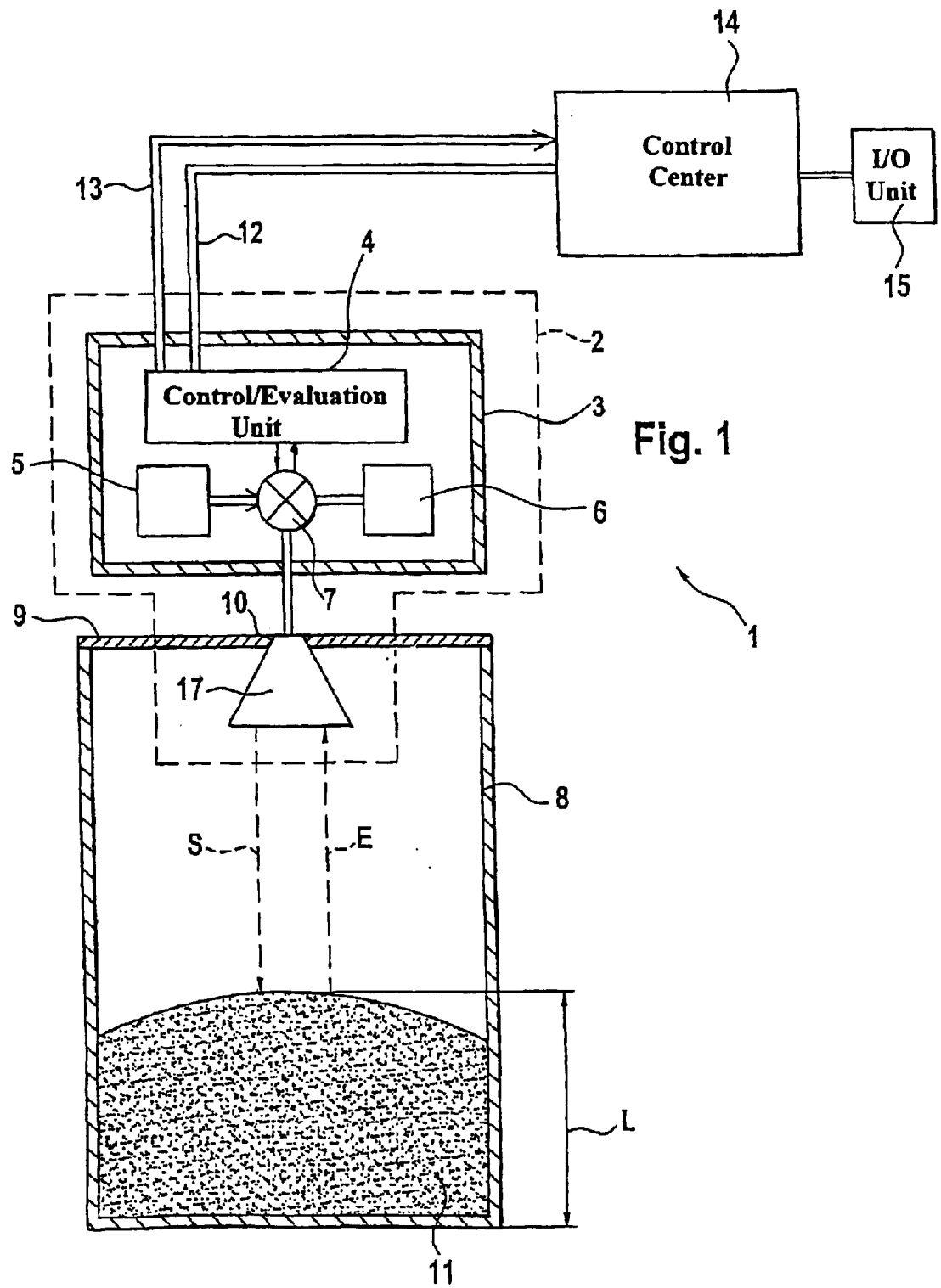
FIG. 1 is a block diagram of one embodiment of the device of the invention.

FIG. 1 shows a block diagram of one embodiment of the device 1 of the invention. A fill material 11 is stored in the container 8. A fill level measurement apparatus 1 serves for determining the fill level L. Apparatus or sensor 2 is mounted in an opening 10 in the lid 9 of the container 8. Transmission signals, especially microwave pulses, produced in the signal production-/transmission-unit 5 are radiated from antenna 17 in the direction of the surface of the fill material 11. The measurement signals are reflected as so-called useful, or true, echo signals at the surface of the fill material 11. These echo signals are received in the receiver unit 6 and, if necessary, transformed to the intermediate frequency. In particular, as already explained above, the time expanded digital envelope curve is formed, which describes the amplitude values of the echo signals as a function of the travel time between antenna 17 and the surface of the fill material 11. The correct clocking of the departure of the transmission signals and reception of the echo signals by the transmission unit 5 and the reception unit 6 proceeds over the transmission-reception separating filter 7. It is understood that, instead of the one antenna 17, separate transmission and reception antennas can be used. According to the invention, the clock rate of the measurement circuit 3 is so controlled by the control-/evaluation-circuit 4, that it is assured that the power requirement of the device 1 of the invention is completely covered over the two-wire line 12, 13 during the active phase, while the 'firing rate' is nevertheless as great as possible. The two-wire line 12, 13 is connected to a control center 14, which in turn is connected to an input-output device 15.

Figure 2:
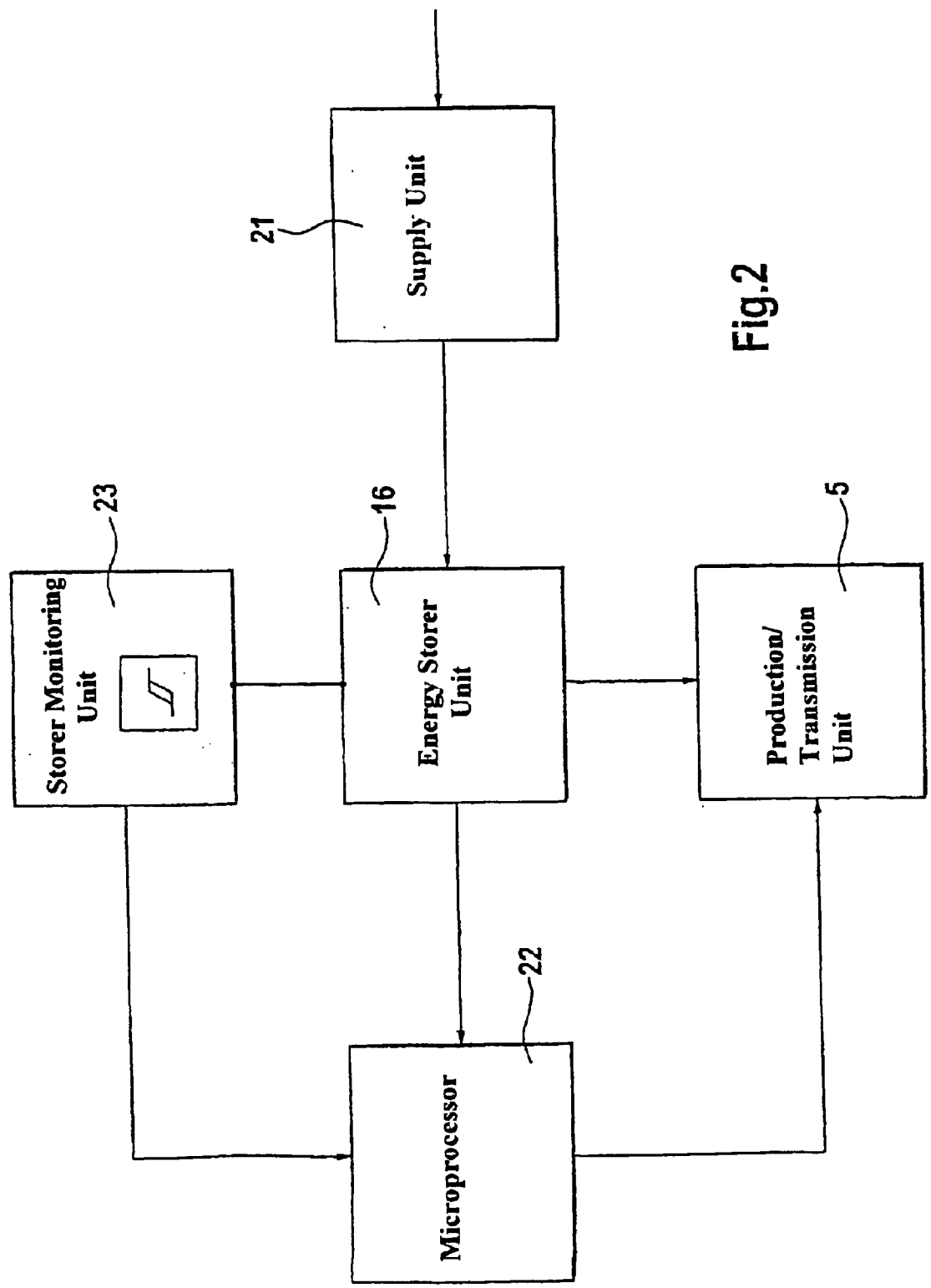
FIG. 2 is a block diagram of the device of the invention.

FIG. 2 is a block diagram of the essential components of the device 1 of the invention. The energy storer unit 16 is supplied with energy through the energy supply unit 21. Preferably, the energy storer unit 16 is charged with a constant current. If the storer monitoring unit 23 recognizes that the predetermined level 'PowerGood' has been reached in the energy storer unit 16, then the microprocessor 22 receives the information that it can initiate the next active phase. The level 'PowerGood' means, preferably, that the energy storer unit 16 is approximately completely charged. Following that, the microprocessor 22 triggers the transmission unit 5, and the transmission unit 5 issues a measurement signal. The energy storer unit 16 supplies also the microprocessor 22 with energy.

The initiation of an active phase, or the issuing of a measurement signal, is preferably controlled according to a program stored in the microprocessor 22. PowerGood and MinCycleTime are predetermined. As already mentioned, PowerGood characterizes preferably the level defined by the energy storer unit 16 at approximately maximum charge. MinCycleTime characterizes a maximum firing rate. This maximum firing rate is not exceeded—not even when the available energy actually would be sufficient for an earlier introduction of the active phase.

Figure 3:
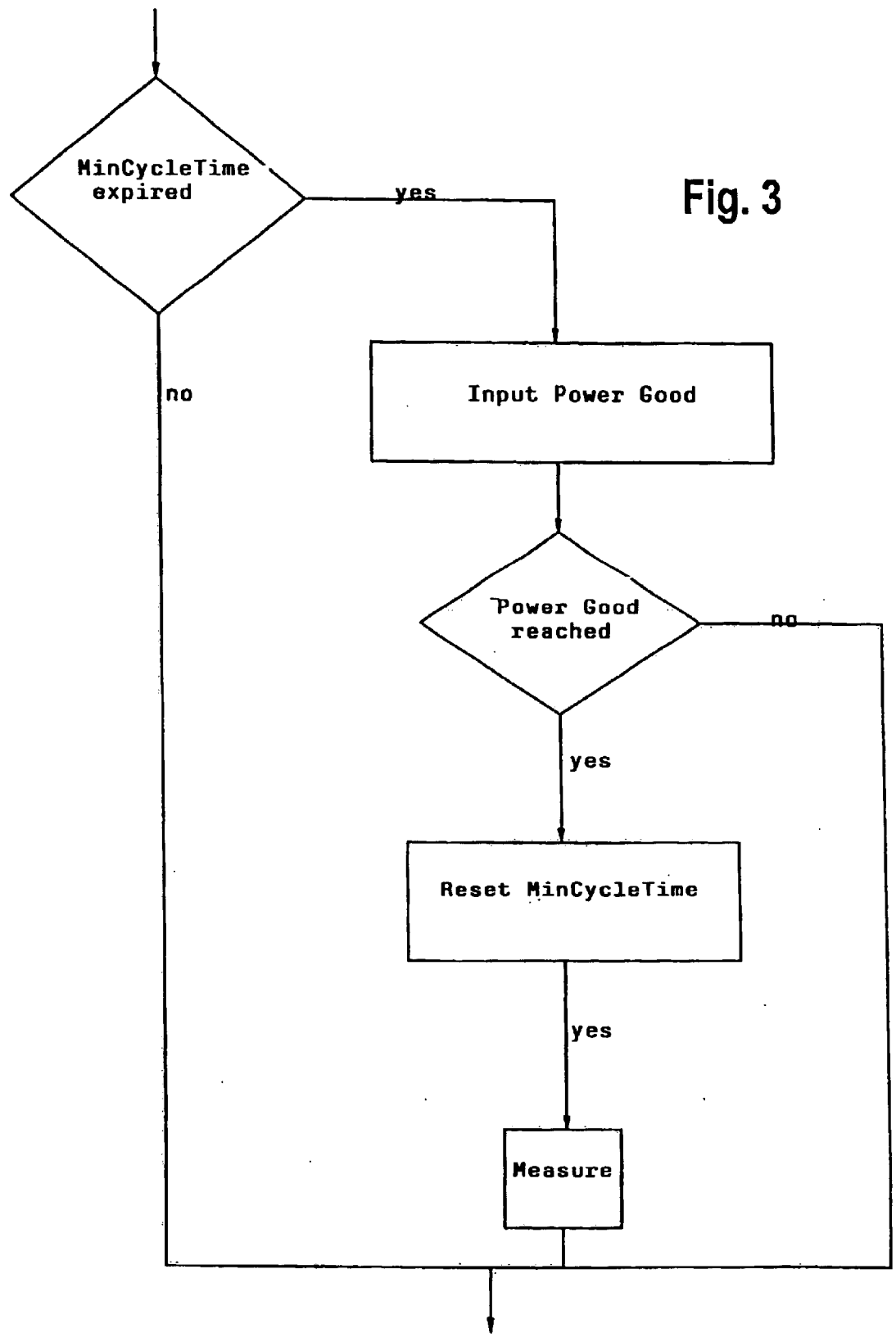
FIG. 3 is a flow diagram for initiating the active phase.

According to the flow diagram shown in FIG. 3, when the level 'PowerGood' has been reached, issue of the measurement signal, or introduction of the next active phase, is delayed, until MinCycleTime has expired.

Figure 4:
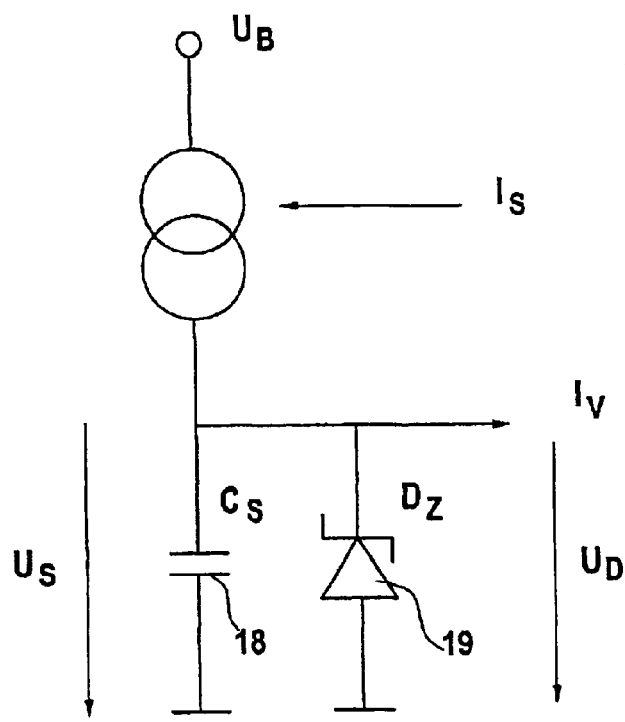
FIG. 4 is a block diagram of a preferred embodiment of the clocked measurement circuit.

FIG. 4 is a block diagram of a preferred energy supply of the measurement circuit with current modulation. The energy storer unit 16 is, in the illustrated case, a capacitor 18 with the capacity $C_s$. The capacitor 18 is charged with a constant current is until the voltage $U_s$ reaches the maximum voltage of the Zener-diode 19 or, in general, the storer limiting unit. The diode 19 is selected such that the available energy has optimum characteristics for the components of the measurement circuit 3 to be driven thereby. As soon as the voltage $U_s$ has reached the maximum possible voltage $D_z$ on diode 19, the current $I_s$ stops flowing into the capacitor 18, but, instead, is turned into heat by the Z-diode 19. As soon as this condition, and only when this condition, is completely reached or, theoretically, almost reached, the active phase is initiated by the control-/evaluation-unit 4.

Figure 5:
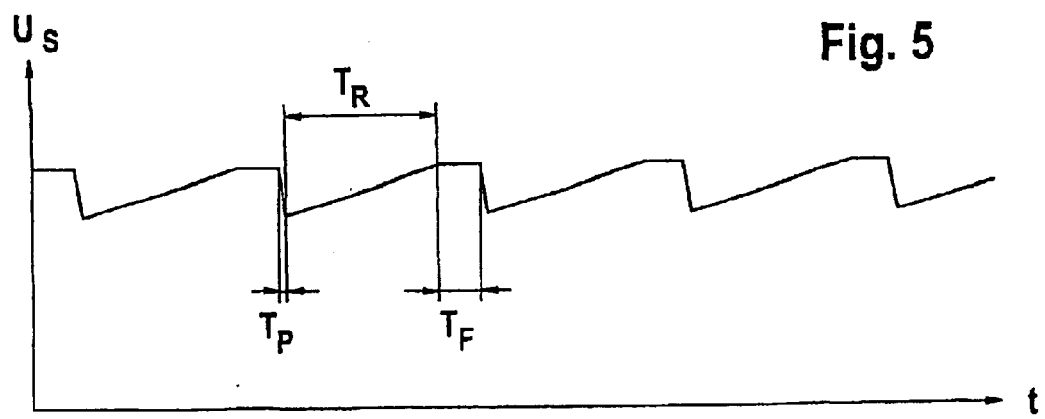
FIG. 5 is a schematic drawing of the voltage transients, which are used preferably for establishing the clock rate of the measurement circuit.

FIG. 5 shows schematically the voltage transients that are preferably referenced for establishing the clock rate of the measurement circuit 3. In particular, the typical course of the voltage $U_S$ (see also FIG. 4) versus time t is displayed in FIG. 5. The course of the voltage is watched, for example, with a microprocessor, which is e.g. part of the control-evaluation-unit 4. During the active phase, thus during the pulse duration $T_P$, a measurement signal is issued in the direction onto the fill material 11; the capacitor 18 is partially discharged. During the recovery period $T_R$, the capacitor 18 is again charged. During the minimum waiting time $T_F$, the capacitor is not charged further. In this time, the transient of the voltage runs parallel to the time axis. An observation of the voltage $U_S$ for recognizing of the horizontal transient during time $T_F$ can, according to an advantageous embodiment of the device 1 of the invention, be referenced as a criterion for when the measurement circuit 3 initiates the next active phase.

According to an alternative embodiment of the device 1 of the invention, instead of the voltage transients, the voltage or current at the storer limiting unit can be used as indicator for the initiating of the next active phase. For instance, if the current or the voltage is watched at the diode 19, then a decision can be made as to whether the energy storer unit 16 is completely charged.

Alternatively, the voltage across the current regulator can be used: If the supply voltage $U_B$ is smaller than the voltage $U_S$ resulting from the storer limiting unit (e.g. the voltage at the diode 19), then the above-stated criterion is never reached. In this case, the voltage across the current sink in fully charged condition will fall below a certain threshold. With reference to the example shown in FIG. 2, this means that $U_B - U_S = 0V$. Consequently, it is possible to use the voltage across the current sink as another criterion for the next active phase. An optimum solution can be achieved by a combination of the two last-named criteria.

A further alternative for determining initiation of the active phase is provided by the calculation of the maximum voltage. If the lowest (after specification of the clamping voltage) voltage $U_S = U_{TH}$ during the minimum waiting time $T_F$ is calculated, then this can be used as a limit voltage for initiating the next active phase. Here, in particular, a simple comparator decides on the allowability of a new active phase. According to a preferred variant of the device 1 of the invention, it is additionally provided that the threshold voltage $U_{TH}$ can be a function of the current I. This permits further optimizing of the 'firing rate', or measurement frequency, of the fill level measurement apparatus 1. In this case, the energy storer unit 16 is no longer completely charged, since the theoretical value for fulfilling the worst-case condition must be smaller than the actual voltage $U_S$ during the minimum waiting time $T_F$.

Figure 6:
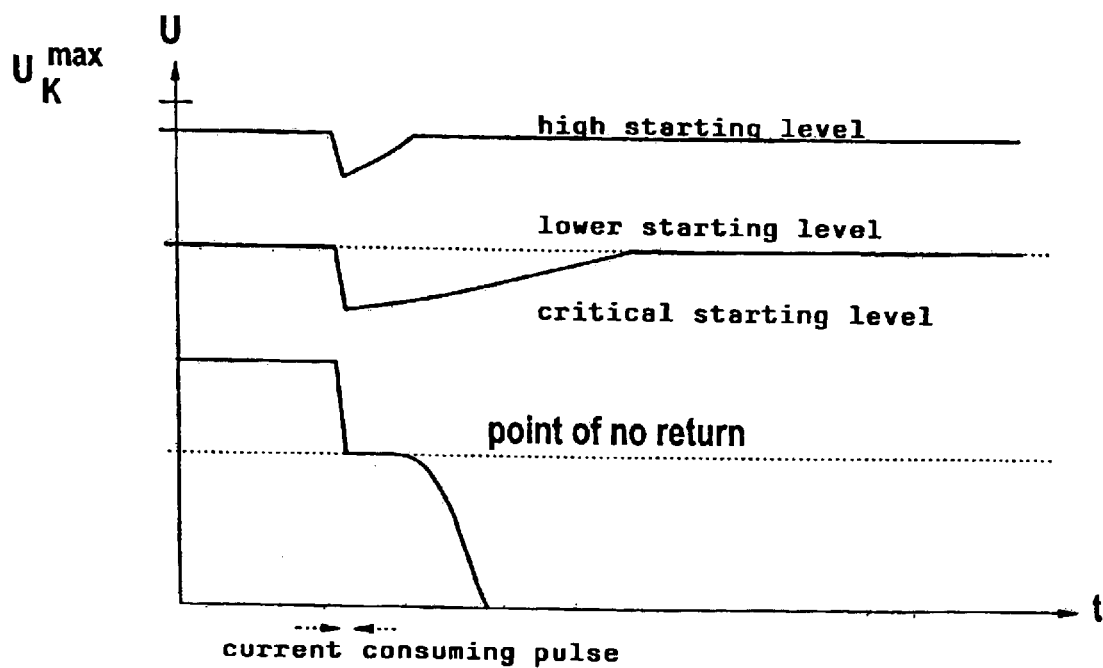
FIG. 6 is a drawing of different voltage curves on a storer unit that is used in the invention.

FIG. 6 shows different voltage curves at an energy storer used according to the invention for optimizing the firing rate of a fill level measurement apparatus. An electrolytic capacitor 18 is used, for example, as energy storer, wherein a main idea of the invention resides in holding this capacitor 18 always at a voltage level as close as possible to the maximum available clamping voltage.

The behavior of voltage following a current consuming pulse—thus the issuing of a measurement pulse—is shown in FIG. 6 for three different starting levels. In this, the course of voltage of the capacitor 18 is a measure for the energy level of the energy storer.

Preferred is that the capacitor 18 be in each case charged as close as possible to the maximum clamping voltage U. The advantage of this solution according to the invention is, on the one hand, to be seen in that the loss power, which is consumed through the current regulator, is decreased; on the other hand, the energy level of the energy storer is regulated to a higher level. This is important above all in the case of use of a DC—DC converter for power optimizing, since the current which is drawn from the energy storer is inversely proportional to the voltage. Consequently, also the recovery time is inversely proportional to the relevant starting voltage—the higher the starting level, the smaller the recovery time and the faster the following transmission pulse can be issued.

Moreover, a voltage level, which approximates the maximum clamping voltage, lies far removed from the critical point. Seen as critical voltage is that voltage level at which the voltage decrease as a result of the issuing of a measurement signal is so great that the 'point of no return' is reached. When this voltage value is reached, the voltage on the capacitor 18 falls to zero.

What is claimed is:

1. A device for measuring and/or monitoring a process parameter, comprising: a sensor;
   a control center; and
   a two-wire line which connects said sensor and said control center, wherein:
   said sensor has an intermittently working measurement circuit, which has at least one energy storer unit, and a control/evaluation unit;
   said measurement circuit is activated for an active phase which accounts for a predetermined time span; and
   said control/evaluation unit activates said measurement circuit, at the earliest, when the energy in said storer unit has reached a predetermined level and, in addition, controls the clock rate of said measurement circuit, thus it is assured that the power demand of the device is completely covered over said two-wire line, during the active phase, while the number of active phases per time unit and the firing rate, respectively, are nevertheless as high as possible.

2. The device as defined in claim 1, wherein:
   the process parameter relates to the fill level of a fill material in a container.

3. The device as defined in claim 1, wherein:
   said sensor comprises a fill level sensor which issues measurement signals in the direction of the surface of a fill material in a container, and which receives echo signals reflected from the surface of the fill material.

4. The device as defined in claim 1, wherein: said energy storer unit is a capacitor.

5. The device as defined in claim 4, further comprising:
a storer limiting unit, wherein:
said storer limiting unit is connected in parallel with said capacitor.

6. The device as defined in claim 1, wherein: said control/evaluation unit initiates said active phase, as soon as a predetermined current voltage and/or voltage value is reached in said measurement circuit, or a component of said measurement circuit.

7. The device as defined in claim 1, wherein: said control/evaluation unit initiates said active phase, when the predetermined current value and/or voltage value is/are constant during a predetermined time interval.

8. The device as defined in claim 1, wherein: said control/evaluation unit inserts an additional minimum wait time before it initiates said active phase.

9. The device as defined in claim 1, wherein: the energy supply of said device and the data exchange between said measurement circuit and said control center occur over said two-wire line.

* * * * *